United States Patent Office

2,928,769
Patented Mar. 15, 1960

2,928,769

PRODUCTION OF CONTROLLED RELEASE MEDICAMENTS

William E. Gaunt, Shaker Heights, Ohio, assignor to Strong, Cobb and Company, Inc., Cleveland, Ohio, a corporation of Delaware No Drawing. Application July 22, 1957
Serial No. 673,168

24 Claims. (Cl. 167—82)

This invention relates to orally administrable controlled release medicaments and more particularly to a new procedure for the production thereof.

Timed release medicaments or the so-called "sustained action," "time delay" or "controlled release" therapeutic products have become increasingly more important over the last several years. These products are based upon the principle that the therapeutically active constituent is released gradually over a period of time as contrasted with conventional products wherein the therapeutically active substance is released substantially all at one time, either practically immediately as in the case of products intended for release in the stomach or after a delay of about two to three hours, as in the case of enterically coated products. The subject of timed release medicaments is at the present time a very active one with more and more products being offered in such form, but it has been widely recognized that these products as heretofore produced leave much to be desired with respect to the extent and period of release of the active substance. In some products the rate of release is very irregular, and in others the resistance to disintegration is too great so that appreciable portions of the active substance pass through the system without being released at all. In some products the rate of release is more rapid than desired, with substantially all of the therapeutic substance being released in a short period of time with consequent danger of overdosage. In still other products, the amount or rate of release is too small or too slow so that the active substance is made available at a subtherapeutic level which is particularly disadvantageous not only because it interrupts therapy, but because, in the case of antibiotics, it enables resistant organism strains to develop. Furthermore, with products containing more than one therapeutically active ingredient, these active ingredients are released uncontrollably at differing rates and over differing periods of time resulting in unbalanced therapeutic effects.

Objects of the present invention are to produce controlled release medicaments having new and valuable characteristics and wherein the manufacturing procedure can be varied, as required for each individual type of medication, so as to obtain a desired or selected release rate whether the medicament is used therapeutically alone or in combination with other active substances. Another and more specific object of the invention is to suspend the therapeutic agent in a volatile organic solvent to which a water-insoluble, organic solvent-soluble metal soap, such as aluminum monostearate is added, heating the mixture to form a gel, evaporating the greater part of the volatile solvent, screening the product to form granules in each of which the therapeutic agent is enmeshed or embedded and removing the remaining solvent by evaporation. Other and further objects and advantages will be pointed out hereinafter or will be understood by those skilled in this art.

According to the present invention, particles of a selected or desired therapeutic agent are suspended in a volatile solvent to which there is then added a water-insoluble metal soap, such as aluminum monostearate, which mixture gels upon warming and the gel thus formed enmeshes the particles of therapeutic agent within its matrix. When aluminum monostearate is used as the metal soap and ligroin or petroleum ether is used as the volatile solvent, the system gels rapidly on warming to 55° to 60° C. The greater part of the solvent is evaporated from the thus-formed gel which is then broken up into small pieces, as by screening, and the remaining solvent evaporated by air drying or low heat to produce hard granules containing within them the particles of the therapeutic agent. The gel granules, such as those of dried aluminum monostearate, provide water-resistant barriers on exposure to gastric juice and intestinal fluid and, as these barriers are gradually broken down, particles of the therapeutic agent are dissolved into the gastric juice or intestinal fluid, and over a period of time the granules gradually release the therapeutic agent to the gastric juice or intestinal fluid until it has been substantially all released.

It has been found that a variety of organic solvents can be used in carrying out the procedure of this invention. These solvents include aliphatic hydrocarbons such as pentane, hexane, and petroleum ether; aromatic hydrocarbons such as benzene, toluene, and xylene; halogenated aliphatic hydrocarbons such as chloroform and carbon tetrachloride; and esters such as ethyl acetate and amyl acetate.

Examples of therapeutic agents which can be formed into timed release medicaments in accordance with the present invention are sedatives such as phenobarbital and acetylcarbromal; tranquilizers such as methyl-n-propyl propanediol dicarbamate (meprobamate) and reserpine; appetite depressants such as phenyl methyl tetrahydroxazine hydrochloride (Preludin) and amphetamine; antihistamines such as thonzylamine hydrochloride; analgesics such as acetyl salicylic acid and salicylamide, vitamins, hormones; anti-infective agents such as the antibiotics and sulfonamides and antispasmodics such as atropine.

Although aluminum monstearate is the preferred water-insoluble metal soap, it is to be understood that other water-insoluble metal stearates and other water-insoluble metal soaps such as aluminum palmitate may be employed. Such a metal soap is the metal compound of a higher fatty acid, such as octoic acid, lauric acid, myristic acid, oleic acid, palmitic acid, and stearic acid, and, for instance, fatty acids containing from 8 to 18 carbon atoms without being limited thereto.

Further in accordance with the invention, it has been discovered that the rate of release of the therapeutic agent may be altered or varied by compressing the granules into tablets and/or by changing the proportion of metal soap to therapeutic agent, in which latter connection it has been found that the greater the proportion of metal soap the slower the release rate and the longer the time over which release is obtained. Therapeutic agents which are highly water-soluble also have been found to require a greater proportion of aluminum monostearate or other metal soap than relatively insoluble substances. In addition, the rate of release may be increased by adding a small amount in the range of about 0.5–5% by weight based on the combined weights of the therapeutic agent and the metal soap of a surface-active agent such as lecithin or one or more of the Tweens to the system prior to gel formation. The Tweens are non-ionic surface-active agents including Tween 20 which is polyoxyethylene sorbitan monolaurate, Tween 40 which is polyoxyethylene sorbitan monopalmitate, Tween 60 which is polyoxyethylene sorbitan monooleate, and Tween 80, also called Polysorbate 80, which is polyoxyethylene (20) sorbitan monooleate.

It will thus be seen that the present invention is characterized by great versatility not only with respect to the nature of the therapeutic agent but with particular respect to the ability to adjust or select the rate of release of the therapeutically-active agent and to provide controlled release products having any desired release rate or release time.

After the granules are produced they may be employed alone or in combination with granules of other therapeutic substances in various dosage forms. They may, for example, be used as such, enclosed in two piece hard shell capsules, compressed into tablets either as they are or in a mixture with conventional binders and diluents or suspended in glycols for oral administration.

The invention is illustrated by the following non-limitative examples:

Example 1

Five (5) grams of phenobarbital U.S.P. is suspended in 40 ml. of petroleum ether (boiling point 55–60° C.) and five (5) grams of aluminum monostearate is added with stirring. The stirring is continued and the mixture is heated slowly on a water bath and, when the temperature of the mixture is raised to about 59° C., the mixture begins to thicken and gel, and in approximately 3 minutes the entire mixture is in the form of a thick gel. The greater part of the solvent is evaporated from the thus-formed gel which is then broken up into small pieces of desired size by screening, following which the remaining solvent is evaporated by drying in air or by low heat, as in an electric oven, to produce hard granules containing within them particles of the therapeutic agent.

On testing granules equivalent to 80 mg. phenobarbital in artificial gastric juice U.S.P. for 1 hour and artificial intestinal fluid U.S.P. thereafter and at 37° C., phenobarbital is released from the granules at the following rate:

| Time | Medium | Milligrams released | Cumulative release | Cumulative percent release |
| --- | --- | --- | --- | --- |
| 1 hour | Artificial gastric juice | 25 | 25 | 31.5 |
| 2 hours | Artificial intestinal fluid | 12 | 37 | 46.5 |
| 3 hours | do | 7 | 44 | 55.0 |
| 4 hours | do | 5 | 49 | 61.5 |
| 5 hours | do | 4 | 53 | 66.5 |
| 6 hours | do | 4 | 57 | 71.5 |
| 7 hours | do | 2 | 59 | 74.0 |
| 21 hours | do | 12 | 71 | 89.0 |

From the foregoing example in which the therapeutic agent and metal soap are used in a 1:1 ratio, it will be observed that during the first hour and using artificial gastric juice as the medium, 31.5% of the phenobarbital is released and that, thereafter during the succeeding 20 hours and using artificial intestinal fluid as the medium, there is a comparatively uniform and regular release of further amounts of phenobarbital, giving unusually good release characteristics over a period of 30 hours and resulting in a total release of approximately 90% of the phenobarbital during the 21 hour period.

Example 2

Twenty (20) grams of phenobarbital U.S.P. is suspended in 50 ml. of petroleum ether and five (5) grams of aluminum monostearate is added with stirring. The mixture is warmed on the water bath and the resulting gel dried.

The granules, and tablets compressed from some of the granules, were tested against artificial gastric juice and artificial intestinal fluid with the following results:

| Time | Medium | Granules, percent release | Tablets, percent release |
| --- | --- | --- | --- |
| 1 hour | gastric juice | 50.0 | 9.0 |
| 2 hours | intestinal fluid | 76.0 | 16.0 |
| 3 hours | do | 86.0 | 21.0 |
| 4 hours | do | 93.0 | 25.0 |
| 5 hours | do | 96.0 | 29.0 |
| 6 hours | do | 98.0 | 31.0 |
| 21 hours | do | | 68.0 |

From the foregoing example in which the therapeutic agent and the metal soap are used in a ratio of 4:1, it will be observed that the use of a lesser proportion of metal soap than in Example 1 markedly increases the rate of release and shortens the total release time. This example also shows how tabletting, as compared to untabletted granules, decreases the release percentage and prolongs the release time.

Example 3

Five (5) grams of phenobarbital U.S.P. is suspended in 20 ml. of petroleum ether and 2.5 grams of aluminum monostearate is added with stirring. The mixture is warmed on the water bath and the resultant gel dried.

Example 4

Five (5) grams of phenobarbital U.S.P. is suspended in 20 ml. of petroleum ether and 2.5 grams of aluminum monostearate is added with stirring. 0.25 gram of Tween 80 and 0.25 gram of lecithin are added and the mixture warmed on the water bath. The resultant gel is dried.

The granules from the above Examples 3 and 4 were exposed to artificial intestinal fluid with the following results:

| Time | Example 3, percent release | Example 4, percent release |
| --- | --- | --- |
| ½ hour | 20 | 37 |
| 1 hour | 27 | 49 |
| 1½ hours | 31 | 55 |
| 2½ hours | 38 | 65 |
| 3½ hours | 42 | 76 |
| 4½ hours | 46 | 81 |
| 19½ hours | 74 | 94 |

The granules from the above examples were also compressed into tablets and tested in artificial gastric juice and intestinal fluid with the following results:

| Time | Medium | Example 3, percent release | Example 4, percent release |
| --- | --- | --- | --- |
| 1 hour | Gastric juice | 2.7 | 3.6 |
| 2 hours | Intestinal fluid | 6.7 | 13.6 |
| 3 hours | do | 8.0 | 17.9 |
| 4 hours | do | 10.7 | 23.7 |
| 5 hours | do | 13.4 | 27.9 |
| 6 hours | do | 14.7 | 32.3 |
| 7 hours | do | 16.0 | 35.1 |
| 8 hours | do | 17.4 | 37.9 |
| 24 hours | do | 25.4 | 53.7 |

In Examples 3 and 4 the ratio of therapeutic agent to metal soap is 2:1, Example 4 also containing added surface active agent. The effects of these factors are clearly reflected in the release percentages and times and the increased percentage release in a given period of time due to the presence of surface active agent is demonstrated.

Example 5

2.5 grams of phenyl methyl tetrahydroxazine hydrochloride (preludin) is suspended in 75 ml. of petroleum ether and 10 grams of aluminum monostearate is added with stirring. The mixture is heated on the water bath and the resultant gel dried.

Example 6

2.5 grams of phenyl methyl tetrahydroxazine hydrochloride (preludin) is suspended in 75 ml. of benzene and 10 grams of aluminum monostearate is added with stirring. The mixture is heated on the water bath and the resultant gel dried.

The granules of these examples were tested with artificial intestinal fluid with the following results:

| Time | Cumulative release, percent | |
|---|---|---|
| | Example 5 | Example 6 |
| 15 minutes | 39.3 | 45.4 |
| 30 minutes | 53.6 | 58.8 |
| 1 hour | 69.6 | 66.5 |
| 1½ hours | 78.6 | 74.6 |
| 2½ hours | 89.3 | 86.0 |
| 3½ hours | 96.4 | 94.2 |
| 4½ hours | 100.0 | 99.0 |
| 5½ hours | 100.0 | 100.0 |

These two examples show the similarity of effect of different volatile organic solvents for the metal soap and also the need for higher proportions of metal soap to therapeutic agent when the latter is very water-soluble. Comparing the results of Example 5 and Example 1, it will be seen that the 4:1 ratio of therapeutic agent to metal soap used with the relatively insoluble phenobarbital gives a release rate slower than the 1:4 ratio of therapeutic agent to metal soap used with the highly water-soluble phenyl methyl tetrahydroxazine hydrochloride.

Example 7

Five (5) grams of phenyl methyl tetrahydroxazine hydrochloride (preludin) is suspended in 150 ml. of petroleum ether and 20 grams of aluminum monostearate and 0.5 gram of lecithin added with stirring. The mixture is heated on the water bath and the resultant gel dried.

Example 8

Five (5) grams of phenyl methyl tetrahydroxazine hydrochloride (preludin) is suspended in 150 ml. of petroleum ether and 20 grams of aluminum monostearate and 1.0 gram of lecithin added with stirring. The mixture is heated on the water bath and the resultant gel dried.

The granules from the above examples were compressed into tablets and tested in artificial gastric juice and artificial intestinal fluid with the following results:

| Time | Medium | Cumulative percent release | |
|---|---|---|---|
| | | Example 7 | Example 8 |
| 1 hour | Gastric juice | 15.2 | 28.2 |
| 3½ hours | Intestinal fluid | 41.4 | 64.0 |
| 4½ hours | do | 47.1 | 80.00 |
| 6½ hours | do | | 88.0 |
| 8 hours | do | | 100.0 |
| 22 hours | do | 86.9 | |

These examples show the effect of increasing the proportion of surface active agent on the release percentage and time, the larger amount of surface active agent providing greater release percentage in the same time interval.

Example 9

Ten (10) grams of salicylamide is suspended in 75 ml. of petroleum ether and 10 grams of aluminum monostearate is added with stirring. The mixture is warmed and the resultant gel dried. The granules were tested in artificial gastric juice and intestinal fluid with the following results:

| Time | Medium | Cumulative percent release |
|---|---|---|
| 1 hour | Gastric juice | 48.0 |
| 2.5 hours | Intestinal fluid | 63.0 |
| 3.5 hours | do | 69.0 |
| 4.5 hours | do | 74.0 |
| 5.5 hours | do | 78.0 |
| 22.0 hours | do | 100.0 |

Example 10

2.5 grams of niacinamide is suspended in 120 ml. of petroleum ether and 20 grams of aluminum monostearate added with stirring. The mixture is warmed on the water bath and the resultant gel dried. The granules were tested in artificial intestinal fluid with the following results:

Time: Percent release
1 hour _____ 41.0
1.5 hours _____ 43.2
2.5 hours _____ 47.4
3.5 hours _____ 51.8
4.5 hours _____ 56.2

In this example there is a 1:8 ratio of therapeutic agent to metal soap again showing that the more soluble the therapeutic agent the greater the proportion of metal soap required.

Example 11

Ten (10) grams of acetyl carbromal is suspended in 75 ml. of petroleum ether (B.P. 55–60° C.). To the stirred suspension, 10 grams of aluminum monostearate is added, the mixture then being heated on a warm water bath. The gelled mixture was transferred from the reaction vessel and dried at 45° C.

On testing the granules with artificial gastric juice and artificial intestinal fluid, the following results were obtained:

| Time | Medium | Percent Release | Cumulative Percent Release |
|---|---|---|---|
| 1 hour | Gastric juice | 11.8 | 11.8 |
| 2 hours | | | |
| 3 hours | Intestinal fluid | 5.0 | 16.8 |
| 4 hours | | | |
| 5 hours | do | | |
| 6 hours | do | | |
| 7 hours | do | 3.4 | 20.2 |

This example illustrates the release of a 1:1 proportion of another and only slightly water-soluble therapeutic agent when tested as indicated over a period of 7 hours.

Example 12

Five (5) grams of phenyl methyl tetrahydroxazine hydrochloride (preludin) is suspended in 120 ml. of petroleum ether and 20 grams of aluminum palmitate is added with stirring. The mixture is heated and the resultant gel processed, as set forth in preceding examples, to provide a granulation which is compressed into tablets.

When tested in artificial gastric juice and artificial intestinal fluid the following results were obtained:

| Time | Medium | Cumulative percent release |
|---|---|---|
| 1 hour | gastric juice | 29.6 |
| 2 hours | intestinal fluid | 37.2 |
| 3 hours | do | 44.8 |
| 5 hours | do | 60.1 |
| 7 hours | do | 74.8 |
| 9 hours | do | 91.4 |

Comparable results are obtained with other therapeutic agents and, as explained above, the procedure can be varied in such manner as to obtain a desired release rate and overall time of release depending upon the particular therapeutic agent and the purpose for which it is being administered. The invention therefore has unique and highly valuable features which have not heretofore been obtained in timed release medicaments so far as I am aware.

I claim:

1. A process for the production of orally administrable controlled release medicaments which comprises suspending particles of a therapeutic agent in a volatile solvent, adding a metal soap soluble in said solvent, heating the mixture and evaporating the greater part of the solvent from the resultant gel, breaking the gel into small pieces and removing the remaining solvent from the pieces of gel by evaporation to produce hard granules each of which contains enmeshed therein particles of the therpaeutic agent.

2. A process for the production of orally administrable controlled release medicaments which comprises forming a gel of particles of a therapeutic agent, a metal soap and a volatile organic solvent for the metal soap, evaporating the greater part of the organic solvent from the gel, subdividing the gel into small pieces, and evaporating the remaining solvent from the pieces of gel to produce hard granules each of which contains therewithin particles of the therapeutic agent.

3. The process of claim 2, in which the metal soap is a long chain fatty acid soap of aluminum.

4. The process of claim 2, in which the metal soap is aluminum monostearate.

5. The process of claim 2, in which the solvent is selected from the group consisting of aliphatic hydrocarbons, halogenated aliphatic hydrocarbons, aromatic hydrocarbons, and esters in which the metal soap is soluble and the therapeutic agent is insoluble.

6. The process of claim 2, in which the release rate and time of the therapeutic agent are controlled by varying the proportion of metal soap relative thereto, the greater the proportion of metal soap the slower the release rate.

7. The process of claim 2, in which the therapeutic agent is phenyl methyl tetrahydroxazine hydrochloride.

8. The process of claim 2, in which the therapeutic agent is phenyl methyl tetrahydroxazine hydrochloride, the organic solvent is petroleum ether and the metal soap is aluminum monostearate.

9. The process of claim 2, in which the therapeutic agent is phenyl methyl tetrahydroxazine hydrochloride, the organic solvent is petroleum ether and the metal soap is aluminum monostearate, the therapeutic agent and the metal soap being present in the ratio of 1:4.

10. The process of claim 2, in which the therapeutic agent is phenyl methyl tetrahydroxazine hydrochloride, the organic solvent is benzene and the metal soap is aluminum monostearate.

11. The process of claim 2, in which the therapeutic agent is phenyl methyl tetrahydroxazine hydrochloride, the organic solvent is petroleum ether and the metal soap is aluminum monostearate, the therapeutic agent and the metal soap being present in the ratio of 1:4, and in which 0.5 gram of lecithin is added prior to gel formation.

12. The process of claim 2, in which the therapeutic agent is phenyl methyl tetrahydroxazine hydrochloride, the organic solvent is petroleum ether and the metal soap is aluminum monostearate, the therapeutic agent and the metal soap being present in the ratio of 1:4, and in which 1.0 gram of lecithin is added prior to gel formation.

13. The process of claim 2, in which the therapeutic agent is phenyl methyl tetrahydroxazine hydrochloride, the organic solvent is petroleum ether and the metal soap is aluminum palmitate.

14. The process of claim 2, in which the therapeutic agent is salicylamide.

15. The process of claim 2, in which the therapeutic agent is niacinamide.

16. The process of claim 2, in which the therapeutic agent is acetyl carbromal.

17. The process of claim 2, in which the rate of release of the therapeutic agent is increased by adding 0.5–5%, based on the combined weight of the therapeutic agent and the metal soap, of a surface active agent to the gel-forming materials prior to gel formation.

18. The process of claim 17, in which the surface active agent is lecithin.

19. The process of claim 17, in which the surface active agent is a polyoxyethylene sorbitan derivative of a higher fatty acid.

20. A process for the production of orally administrable controlled release granules which comprises suspending particles of phenobarbital in petroleum ether, adding aluminum monostearate to such suspension under stirring, warming the mixture slowly on a water-bath with continued stirring until its temperature is raised to approximately 59° C., whereupon the mixture begins to thicken and gel, permitting the mixture to become a thick gel, removing the greater part of the petroleum ether by evaporation, screening the gel to break it up into pieces and removing the remaining petroleum ether by evaporation to form timed release granules in each of which particles of phenobarbital are enmeshed within a water-resistant barrier.

21. The process of claim 20, in which the ratio of phenobarbital to aluminum monostearate is 1:1.

22. The process of claim 20, in which the ratio of phenobarbital to aluminum monostearate is 4:1.

23. The process of claim 20, in which the ratio of phenobarbital to aluminum monostearate is 2:1.

24. The process of claim 20, in which the ratio of phenobarbital to aluminum monostearate is 2:1 and in which 0.25 gram of lecithin and 0.25 gram of polyoxyethylene(20) sorbitan monooleate are added prior to gel formation.

References Cited in the file of this patent

UNITED STATES PATENTS

| | | |
|---|---|---|
| 2,409,950 | Meyer | Oct. 22, 1946 |
| 2,544,272 | Miller | Mar. 6, 1951 |
| 2,637,679 | Gaunt | May 5, 1953 |
| 2,661,315 | Jurist | Dec. 1, 1953 |
| 2,690,414 | Buckwalter | Sept. 28, 1954 |
| 2,719,103 | Jurist | Sept. 27, 1955 |
| 2,738,303 | Blythe | Mar. 13, 1956 |
| 2,768,112 | Buckwalter | Oct. 23, 1956 |
| 2,793,979 | Svedres | May 28, 1957 |
| 2,805,977 | Robinson | Sept. 10, 1957 |

FOREIGN PATENTS

| | | |
|---|---|---|
| 148,311 | Australia | Sept. 23, 1952 |
| 285,091 | Great Britain | June 10, 1929 |
| 514,047 | Great Britain | Oct. 30, 1939 |

OTHER REFERENCES

Merck Index, 6th Ed., Merck and Co., Rahway, N.J., 1952, p. 738.